United States Patent [19]
Koopman, Jr.

[11] Patent Number: 5,659,159
[45] Date of Patent: Aug. 19, 1997

[54] ELEVATOR LEVEL CONTROL SYSTEM USING ELEVATOR/LANDING GAP AS A REFLECTION DUCT

[75] Inventor: Philip J. Koopman, Jr., Hebron, Conn.

[73] Assignee: Otis Elevator Company, Farmington, Conn.

[21] Appl. No.: 357,690

[22] Filed: Dec. 16, 1994

[51] Int. Cl.$^6$ .................................. B66B 1/34; B66B 3/00
[52] U.S. Cl. ................................ 187/291; 187/394
[58] Field of Search .......................... 187/394, 391, 187/281, 283, 291; 250/227.14, 208.4, 208.2

[56] References Cited

U.S. PATENT DOCUMENTS

| | | | |
|---|---|---|---|
| 3,486,640 | 12/1969 | Lemelson | 214/16.4 |
| 3,822,766 | 7/1974 | Suter | 187/29 R |
| 3,857,466 | 12/1974 | Berkovitz et al. | 187/52 |
| 4,134,476 | 1/1979 | Zolnerovich, Jr. et al. | 187/29 R |
| 4,256,203 | 3/1981 | Masel | 187/29 |
| 4,362,224 | 12/1982 | Fairbrother | 187/29 |
| 4,363,026 | 12/1982 | Salmon | 340/347 |
| 4,375,057 | 2/1983 | Weise et al. | 340/21 |
| 4,520,904 | 6/1985 | Rado et al. | 187/29 |
| 4,674,604 | 6/1987 | Williams | 187/113 |
| 4,832,159 | 5/1989 | Ikejima et al. | 187/129 |
| 4,977,984 | 12/1990 | Arnosti et al. | 187/134 |
| 5,223,680 | 6/1993 | Schmidt-Milkau et al. | 187/134 |
| 5,509,505 | 4/1996 | Steger et al. | 187/394 |

FOREIGN PATENT DOCUMENTS 2211046  6/1989  United Kingdom.

Primary Examiner—Robert Nappi

[57] ABSTRACT

An emitter and a plurality of sensors and are used to detect the relative positions between an elevator platform and landing sill. The emitters radiate energy through a reflection duct formed between the elevator platform and the landing sill. The plurality of sensors monitor the reflection duct so that radiated energy is detected. The sensors provide level signals in response to the radiated energy. A means responsive to the level signals determines when the platform is level with respect to the landing sill.

19 Claims, 4 Drawing Sheets

ELEVATOR LEVEL CONTROL SYSTEM USING ELEVATOR/LANDING GAP AS A REFLECTION DUCT

BACKGROUND OF THE INVENTION

1. Technical Field

The present invention relates to a method and an apparatus for leveling an elevator car at a landing sill.

2. Background Art

To stop an elevator smoothly and level with a sill, an elevator system must know when to initiate a stop, when to go into a leveling mode of operation, and when to begin opening the landing doors. The elevator system initiates a leveling mode of operation when the car reaches a leveling zone in the hoistway. Most elevators begin opening the landing doors two to three inches before the elevator platform is actually level with the sill to speed-up passenger transfer. This zone is known as a door zone. To perform these functions accurately, it is necessary to know the exact location of the car at all times. Elevator position transducer devices are used to monitor car position.

One existing elevator position transducer device is a Primary Position Transducer. The Primary Position Transducer ("PPT") is a digital encoder that is located in the machine room over the hoistway. It is driven by a steel tooth-tape that is attached to and runs with the car down the length of the hoistway. An idler sheave is disposed in the hoistway pit to prevent the tape from fluttering in the hoistway. This device requires contact with the elevator and is subject to errors resulting from floor location drift. Floor drift is caused by many factors such as building settlement, building expansion and contraction, and cable expansion and contraction.

Another device for determining elevator position includes steel bars or vanes attached to a floating steel tape, running the length of the hoistway, and a hoistway position reader box mounted on the car which are used to monitor the car position. The vanes must be precisely located with respect to their corresponding landing sills to mark the approximate stopping distance from landing, the leveling zone, and the door zone. The reader box contains switches that sense the location of each vane as the car travels up and down the hoistway. This device also requires contact with the elevator and is subject to errors caused by floor drift.

Another device for elevator position detection includes a plurality magnets precisely placed at each landing sill to mark the approximate stopping distance from landing, the leveling zone, and the door zone. A sensor responsive to the magnets is attached to the elevator car. This device requires that each magnet must be precisely placed at each landing sill.

Other devices, such as governor shaft encoders or motor shaft encoders, are subject to cumulative errors from sources such as cable stretch and slippage. Still other devices, such as a electromagnetic wave phase measurement device, can measure the car location but not with precise relation to the landing sill because the sill location is subject to change as a result of building settlement, building expansion and contraction, and cable expansion and contraction.

DISCLOSURE OF INVENTION

It is an object of the present invention to provide an elevator level control system and method which provides improved detection of relative positions between an elevator platform and a landing sill.

It is another object of the present invention to provide an elevator level control system which is not subject to cumulative errors such as floor drift or cable stretch.

It is a further object of the present invention to provide an elevator level control system and method which does not require contact with the elevator.

It is a yet another object of the present invention to provide an improved elevator level control system which is inexpensive to install and maintain.

According to the present invention, an emitter and a plurality of sensors are used to detect the relative positions between an elevator platform and landing sill. The emitter radiates energy through a reflection duct formed between the elevator platform and the landing sill. The plurality of sensors monitor the reflection duct such that radiated energy is detected. The sensors provide level signals in response to the radiated energy. A means responsive to the level signals determines when the platform is level with respect to the landing and is implemented either by a CPU cooperating with a memory and programming or by various electronic circuit arrangements.

Among the advantages of the present invention is providing the ability to accurately position an elevator cab level with a landing sill without the need for special sensors, magnets, vanes, or other structures at each landing. This increases the ease of installation and reduces installation and maintenance costs. Additionally, the present invention provides a non-contact elevator level control system which is not subject to cumulative errors such as floor drift or cable stretch.

BRIEF DESCRIPTION OF THE DRAWINGS

The foregoing and other objects, features and advantages of the present invention will become more apparent in light of the following detailed description and accompanying drawings where.

BEST MODE FOR CARRYING OUT THE INVENTION

Figure 1:
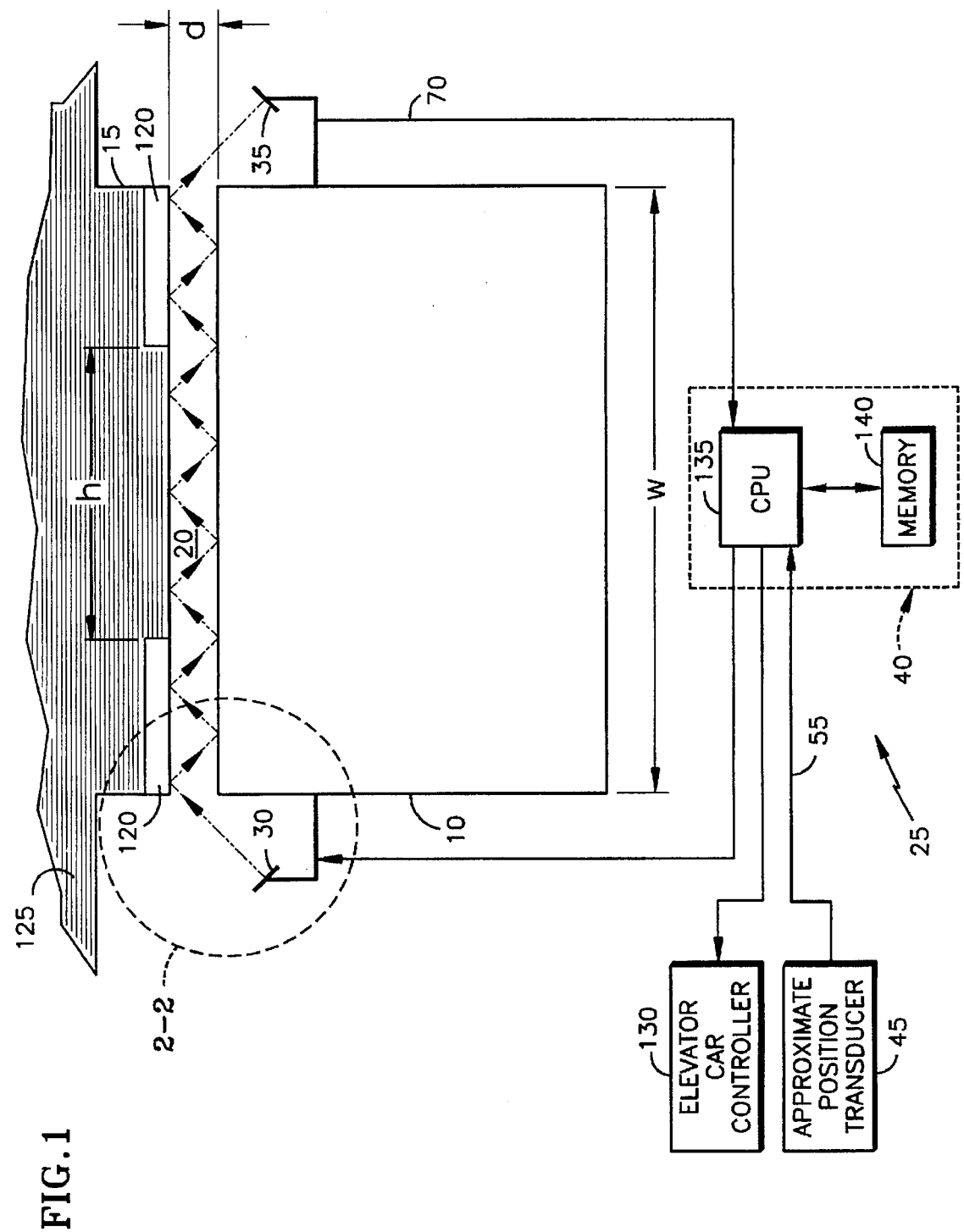
FIG. 1 is a schematic plan view of an elevator platform and landing sill employing a preferred embodiment of the present invention.

Referring to FIG. 1, an elevator platform 10 is shown adjacent to a landing sill 15 such that a reflection duct 20 is formed by a gap between the platform 10 and the sill 15. The reflection duct 20 provides a conduit for the transmission of energy as is explained hereinbelow. An elevator level control system 25 includes an emitter array 30, a sensor array 35 and a level controller 40 for determining when the platform 10 is level with respect to the landing sill 15. In a preferred embodiment, the elevator level control system 25 operates in conjunction with an approximate position transducer 45 such as, but not limited to, a governor shaft encoder or a motor shaft encoder. These types of transducers are well known to one of ordinary skill in the art. The approximate position transducer 45 provides an approximate position signal 55 to the elevator level control system 25. The level controller 40 processes this signal to assist in leveling the elevator with the landing sill 15 as is described below.

Figure 2:
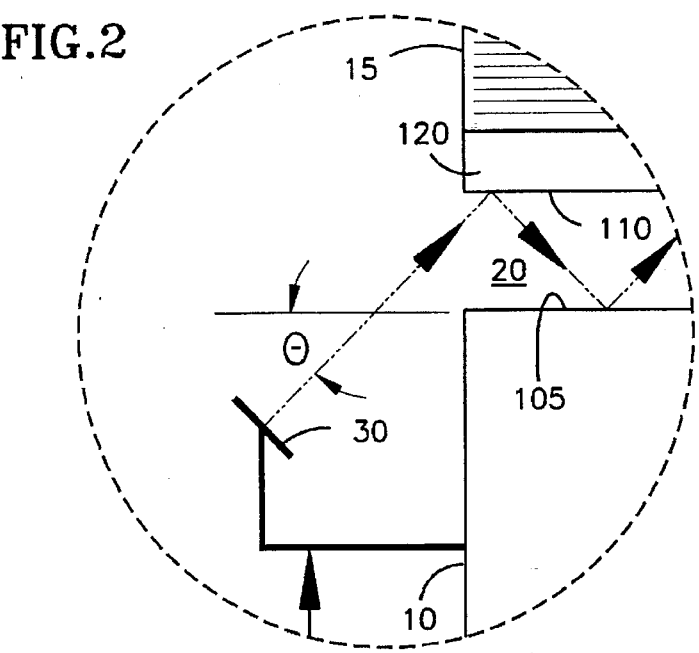
FIG. 2 is a magnified view of an emitter array taken along line 2—2 of FIG. 1.
Figure 3:
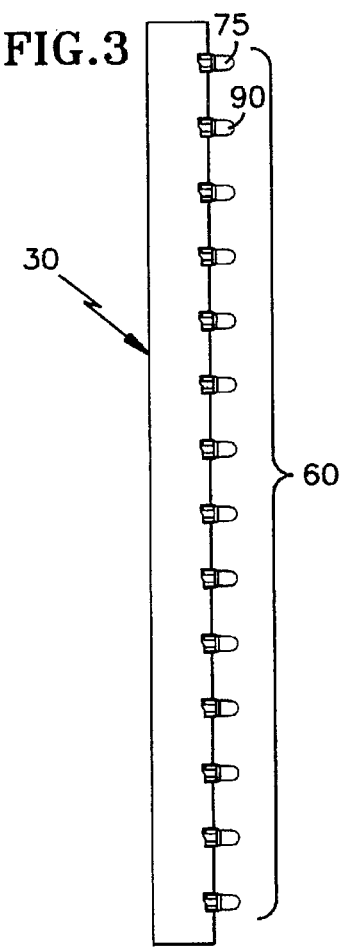
FIG. 3 is a side view of an emitter array of FIG. 1.

Referring to FIGS. 1, 2 and 3, the emitter array 30 is shown. The present invention only requires one emitter 60, however, in a preferred embodiment, the emitter array 30 includes a plurality of emitters 60 which is used to radiate energy. Each emitter 60 is a radiation source which projects energy through the reflection duct 20; for example, a quarter-wave antenna attached to diodes which radiate energy at the desired wavelength. The energy wavelength is preferably smaller than the reflection duct 20 width to achieve proper reflection of the energy. In one preferred embodiment of the present invention, a one millimeter wavelength is used with a one centimeter width reflection duct 20.

The emitter array 30 is attached to one side of the platform 10 such that the emitters 60 may radiate energy into the reflection duct 20. The angle θ of the emitter array 30 (shown in FIG. 2) with respect to the platform 10 determines the number of reflections of the energy in the reflection duct 20. A small number of reflections should be attained to avoid absorption of the energy such that a maximum energy level is achieved. In one preferred embodiment of the present invention, three reflections of the energy in the reflection duct 20 are used. The angle θ may be calculated as follows:

$$\theta = \tan^{-1}\left(\frac{d}{\left(\frac{w}{r+1}\right)}\right)$$

Wherein θ is the angle of the emitter array 30 with respect to the platform 10; d is the distance between the platform 10 and the sill 15; w is the width of the elevator platform 10; and r is the number of reflections of the energy in the duct 20.

For example, if the elevator platform 10 width is two meters, the distance between the platform 10 and the sill 15 is one centimeter and three reflections are desired then the angle θ is 1.15°.

Figure 4:
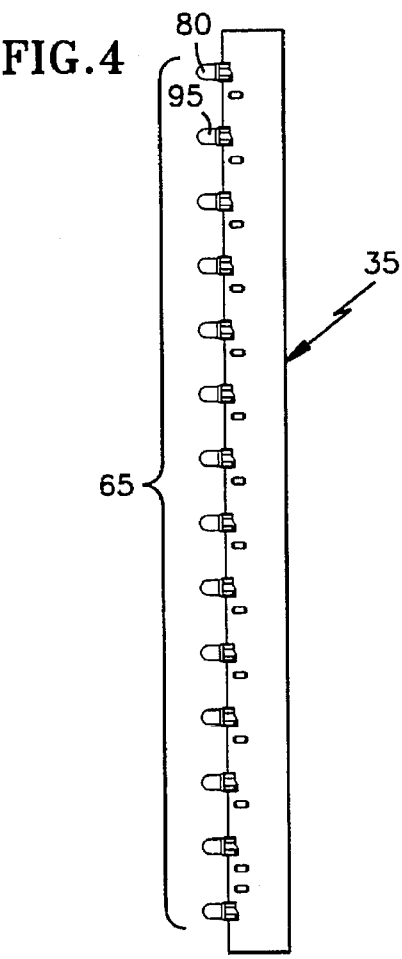
FIG. 4 is a side view of a sensor array of FIG. 1.

Referring to FIG. 4, the sensor array 35 is shown. The sensor array 35 includes a plurality of sensors 65 which is used to detect the energy radiated by the emitters 60. Each sensor 65 is a device that is responsive to the energy radiated by the emitters 60; for example, a quarter-wave antenna attached to diodes which detect energy at the wavelength radiated by the emitters 60. The plurality of sensors 65 is attached to the opposite side of the platform 10 with respect to the plurality of emitters 60 so that the sensors 65 may detect radiation emanating from the reflection duct 20. The angle of the sensor array 35 is chosen to maximize the detection of the radiated energy. For example, an angle equivalent to the angle θ may be used. Each sensor 65 produces a level signal 70 in response to the energy radiated from the emitters 60. Moreover, each sensor 65 is threshold sensitive such that if a predetermined magnitude of energy is detected by the sensor 65, the level signal 70 includes a value representative of a logic "1". If the detected magnitude is below the predetermined threshold then the level signal 70 includes a value representative of a logic "0".

In a preferred embodiment, the sensors 65 are positioned such that they detect energy radiated by a corresponding emitter 60. If the energy radiated by the emitter 60 is detected, the corresponding sensor 65 provides a level signal 70 which represents a logic "1". Conversely, if the energy radiated by the emitter 60 is not detected, the corresponding sensor 65 provides a level signal 70 which represents a logic "0". For example, if the energy radiated by a first emitter 75 (top emitter) is not detected by a first sensor 80 (top sensor) then the first sensor 80 provides a first level signal 85 which represents a logic "0". Likewise, if the energy radiated by a second emitter 90 (second emitter from top) is not detected by a second sensor 95 (second sensor from top) then the second sensor 95 provides a second level signal 100 which represents a logic "0". In a preferred embodiment, the first sensor 80 is positioned such that it is substantially level with the platform 10 as is shown in FIG. 5.

Figure 5:
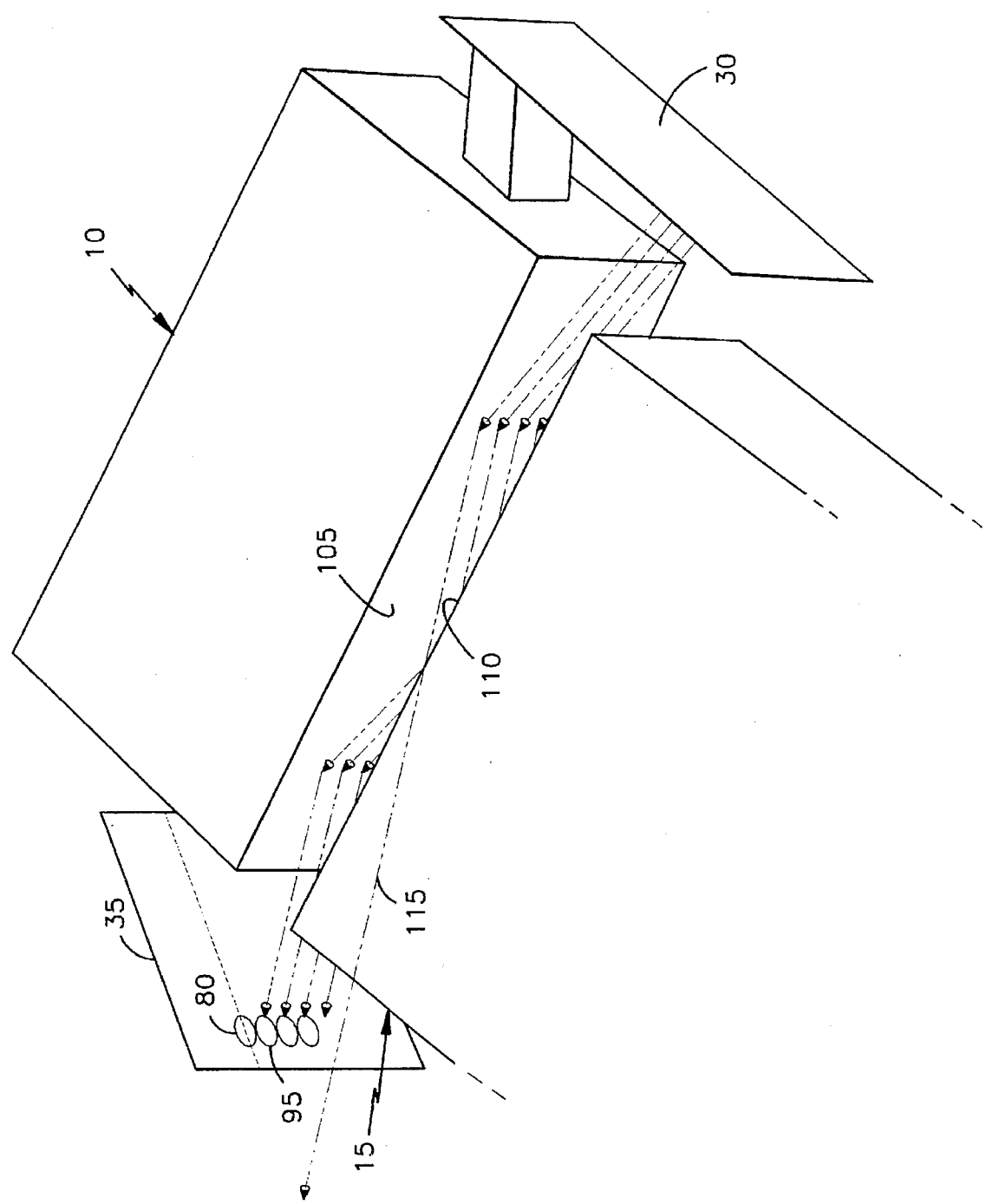
FIG. 5 is a perspective view of an elevator platform, a landing sill, an emitter array and a sensor array.

Referring to FIG. 5, the reflection duct 20 created by the gap between the platform 10 and the landing sill 15 is used for the transmission of energy from the emitter array 30 to the sensor array 35. The boundaries of the reflection duct 20 are formed by an elevator platform wall 105 and a landing sill wall 110. Energy is radiated by the emitter array 30 at angle θ such that the energy reflects between the elevator platform wall 105 and the landing sill wall 110. Energy radiated by emitters 60 positioned below the landing sill 15 is contained by the reflection duct 20. Energy radiated by emitters 60 positioned above the landing sill 15 escapes the reflection duct 20 by traveling above the landing sill 15. Thus, the reflection duct 20 is used as a conduit for the transmission of energy from the emitters 60 to the sensors 65.

In a preferred embodiment, two emitters 75, 90 of the emitter array 30 are used in determining if the elevator platform 10 is level with respect to the landing sill 15. The first emitter 75 is positioned such that it is substantially level with the landing sill 15 if the elevator platform 10 is level with the landing sill 15. The second emitter 90 is positioned such that it is below the landing sill 15 if the elevator platform 10 is level with the landing sill 15. Positioning the emitters 75,90 in this manner provides that the energy radiated by the second emitter 90 reflects between the platform wall 105 and the landing sill wall 110 if the platform 10 is either level with respect to the sill 15 (as shown in FIG. 5) or below the sill 15. Consequently, the energy radiated by the second emitter 90 is contained by the reflection duct 20 and received by the sensor array 35. However, the energy 115 radiated by the first emitter 75 travels above the sill 15 and escapes the reflection duct 20 if the platform 10 is either level with respect to the sill 15 (as shown in FIG. 5) or above the sill 15.

Alternatively, a single emitter 60 is used to radiate energy. The emitter 60 is positioned such that a predetermined magnitude of energy is radiated below the sill 15 and into the reflection duct 20 if the platform 10 is level with respect to the sill 15. Each sensor 65 is threshold sensitive such that if the predetermined magnitude of energy is detected by the sensor 65, its level signal 70 includes a value representative of a logic "1". In a preferred embodiment, the emitters 60 is substantially level with the sill 15.

The landing doors 120 (shown in FIG. 1) either allow the energy radiated above the sill 15 to escape into a hallway 125, absorb the energy or reflect the energy away from the reflection duct 20. In one preferred embodiment, the landing doors 120 are constructed of a material that either absorbs or disperses energy. This assures that energy above the sill 15 is not reflected by the landing doors 120 into the reflection duct 20 and received by the sensors 65.

Alternatively, the number of reflections is adjusted to ensure that the energy escapes through partly open doors. Typically, elevator systems begin opening the landing doors 120 two to three inches before the car is actually level with the sill 15 to speed-up passenger transfer. Therefore, the energy radiated by emitters 60 above the sill 15 is directed to pass through the doors as they begin to open.

If the landing doors 120 are center opening doors, then a number of bounces equal to 1,5,9,13 or 17 . . . etc. (i.e. $n_{i+1}=n_i+4$ where $n_1=1$ & $i=1,2,3,4$ . . . ) ensures that the energy hits the center of the landing door opening and the energy above the sill 15 passes through the door opening and escapes into the hallway 125.

If the landing doors 120 are other than center opening, such as a single slide door, then the number of reflections and the angle θ is appropriately chosen to allow the energy above the sill 15 to escape through the door opening. The number of reflections required to allow the energy to escape is described by the following equation:

$$r>(w/h)-1$$

wherein r is the number of reflections, w is the elevator car width, and h is the landing door opening.

For example, if w is 2 m, and h is 20 cm then a minimum of 9 reflections is required to assure that the energy above the sill 15 escapes through the door opening. To achieve 9 reflections an angle θ of 2.86° is chosen by substituting the given numbers into the angle θ described above; this assumes that the distance (d) between the platform 10 and the sill 15 is 1 cm.

Referring again to FIG. 1, the level controller 40 determines if the platform 10 is level with respect to the landing sill 15. The level controller 40 is electrically connected to the emitter array 30, the sensor array 35, the approximate position transducer 45 and an elevator car controller 130 and may be realized by a CPU 135 cooperating with a memory 140 and programming which implements the operation described below.

Figure 6:
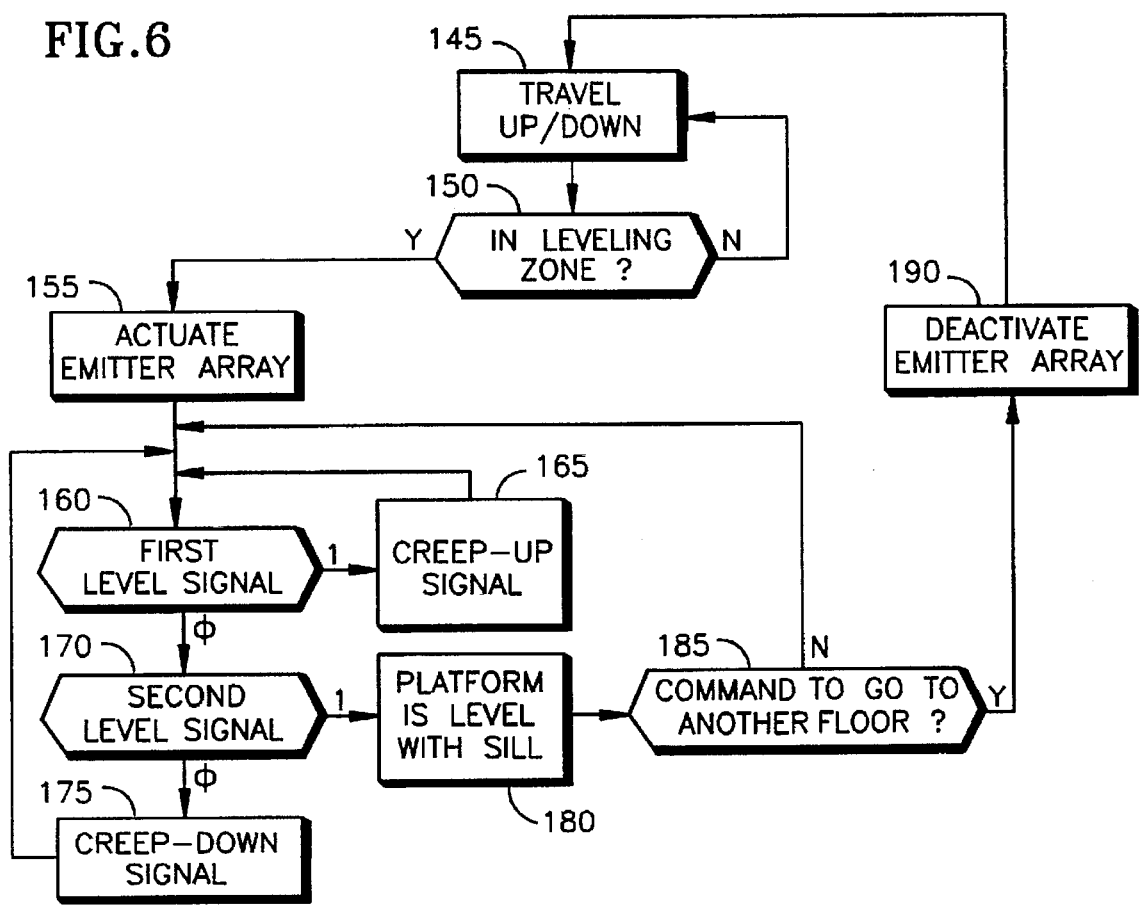
FIG. 6 is a flow diagram of a preferred operation of the present invention.

FIG. 6 shows a flow diagram of a preferred operation of the present invention. Beginning with block 145, the elevator moves up or down to respond to a car call or a passenger floor selection. In step 150, the level controller 40 ascertains whether the approximate position transducer 45 has determined if the elevator is in the leveling zone. If the elevator is not in the leveling zone then level controller 40 returns to step 145 to continue the elevator motion in the up or down direction. If the elevator is in the leveling zone then the level controller 40 moves to step 155 and actuates the emitter array 30 such that the emitter array 30 radiates energy into the reflection duct 20.

Next, the level controller 40, in step 160, determines if the first level signal 85 is a logic "1" or a logic"0". If the first level signal 85 represents a logic "1" then the level controller 40 provides a creep-up signal 195 to an elevator car controller 130 which causes the elevator to slowly rise. Next, the level controller 40 will return to step 160 to determine if the first level signal 85 represents a logic"1" or a logic "0". If the first level signal 85 represents a logic "0" then the level controller 40 moves to step 170 where it determines whether the second level signal 100 represents a logic "1" or a logic"0". If the second level signal 100 represents a logic "0" then the level controller 40 provides a creep-down signal 200 to an elevator car controller 130 which causes the elevator to slowly descend. If the second level signal 100 represents a logic "1" then the level controller 40 determines in step 180 that the elevator platform 10 is level with the landing sill 15 and moves to step 185. In step 185, the level controller 40 determines whether there is a command to go to another floor. If such a command does not exist then the level controller 40 returns to step 160. This ensures that the platform 10 remains level with the sill 15. If a command to go to another floor exists then the level controller 40 deactivates the emitters 60 in step 190 and moves back to step 145.

Figure 7:
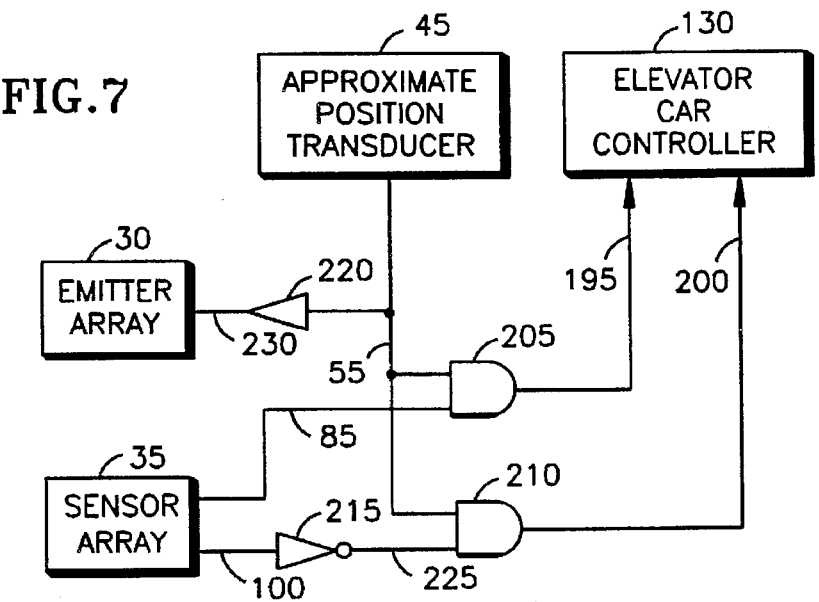
FIG. 7 is a schematic representation of a preferred embodiment of a level controller.

Alternatively, the above-mentioned level control operation may be realized with various electronic circuits arrangements such as the preferred arrangement shown in FIG. 7 which includes first and second AND gates 205, 210, an INVERTER 215 and a NON-INVERTING BUFFER 220. The sensor array 35 is electrically connected to the first AND gate 205 and the INVERTER 215 for providing the level signals 70 to the level controller 40. The first sensor 80 in the sensor array 35 provides the first level signal 85 and the second sensor 95 in the sensor array 35 provides the second level signal 100. The INVERTER 215 is electrically connected to the second AND gate 210 for providing an inverted level signal 225. The approximate position transducer 45 is electrically connected to the first AND gate 205, the second AND gate 210 and the NON-INVERTING BUFFER 220 for providing the approximate position signal 55 to the level controller 40. The NON-INVERTING BUFFER 220 is electrically connected to the emitter array 30 to provide an actuate signal 230 to the emitter array 30. The first and second AND gates 205, 210 are electrically connected to the elevator car controller 130 to provide the creep-up and creep down signals 195, 200 to the elevator car controller 130 respectively.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. An elevator level control system for detecting relative positions between an elevator platform and a landing sill, said elevator level control system comprising:

a) an emitter for radiating energy into a reflection duct created by a gap between the platform and the landing sill such that the energy is transmitted through the reflection duct;

b) the reflection duct having boundaries comprising an elevator platform wall and a landing sill wall such that the radiated energy reflects between the elevator platform wall and the landing sill wall;

c) a plurality of sensors for providing level signals in response to the radiated energy of said emitter; and d) means for determining the relative position between the platform and the landing sill, said means responsive to the level signals.

2. An elevator level control system as recited in claim 1 wherein said emitter is attached to the platform.

3. An elevator level control system as recited in claim 1 wherein said plurality of sensors is attached to the platform.

4. An elevator level control system as recited in claim 1 wherein said emitter is attached to one side of the platform and said plurality of sensors is attached to the opposite side of the platform with respect to said emitter.

5. An elevator level control system as recited in claim 1 wherein said emitter is attached to the platform at an angle θ with respect to the platform, wherein:

$$\theta = \tan^{-1}\left(\frac{d}{\left(\frac{w}{r+1}\right)}\right)$$

wherein d is a distance between the platform and the sill, w is a width of the elevator platform, and r is a number of reflections of the energy in the duct.

6. An elevator level control system as recited in claim 1, further comprising an elevator position transducer device.

7. An elevator level control system for detecting relative positions between an elevator platform and a landing sill, said elevator level control system comprising:

a) a plurality of emitters for radiating energy into a reflection duct created by a gap between the platform and the landing sill such that the energy is transmitted through the reflection duct;

b) the reflection duct having boundaries comprising an elevator platform wall and a landing sill wall such that the radiated energy reflects between the elevator platform wall and the landing sill wall;

c) a plurality of sensors for providing level signals in response to the radiated energy of said plurality of emitters; and d) means for determining the relative position between the platform and the landing sill, said means responsive to the level signals.

8. An elevator level control system as recited in claim 7 wherein said plurality of emitters is attached to the platform.

9. An elevator level control system as recited in claim 7 wherein said plurality of emitters is attached to one side of the platform and said plurality of sensors is attached to the opposite side of the platform with respect to said plurality of emitters.

10. An elevator level control system as recited in claim 7 wherein said plurality of emitters is attached to the platform at an angle $\theta$ with respect to the platform, wherein:

$$\theta = \tan^{-1}\left(\frac{d}{\left(\frac{w}{r+1}\right)}\right)$$

wherein d is a distance between the platform and the sill, w is a width of the elevator platform, and r is a number of reflections of the energy in the duct.

11. An elevator level control system as recited in claim 7 wherein said plurality of emitters comprises a first emitter positioned such that it is substantially level with the landing sill if the platform is level with the sill and a second emitter positioned such that it is below the sill if the platform is level with the sill.

12. An elevator level control system for detecting relative positions between an elevator platform and a landing sill, said elevator level control system comprising:

a) a plurality of emitters for radiating energy into a reflection duct created by the gap between the platform and the landing sill such that the energy is transmitted through the reflection duct;

b) the reflection duct having boundaries comprising an elevator platform wall and a landing sill will such that the radiated energy reflects between the elevator platform wall and the landing sill wall;

c) a plurality of sensors for providing level signals in response to the radiated energy of said plurality of emitters; and d) a level controller for determining the relative position between the platform and the landing sill, said means responsive to the level signals.

13. A method for detecting a relative position between an elevator platform and a landing sill, said method comprising:

a) emitting energy into a reflection duct created by the gap between the platform and the landing sill, the reflection duct having boundaries comprising an elevator platform wall and a landing sill wall such that the radiated energy reflects between the elevator platform wall and the landing sill wall so that the energy is transmitted through the reflection duct;

b) detecting the energy transmitted through the reflection duct;

c) providing level signals in response to detecting the energy in said detecting step; and d) determining from the level signals the relative position between the platform and the landing sill.

14. An elevator level control system for detecting relative positions between an elevator platform and a landing sill, said elevator level control system comprising:

a) an emitter for radiating energy into a reflection duct created by a gap between the platform and the landing sill such that the energy is transmitted through the reflection duct;

b) a plurality of sensors for providing level signals in response to the radiated energy of said emitter; and c) means for determining the relative position between the platform and the landing sill, said means responsive to the level signals and said emitter being attached to the platform at an angle $\theta$ with respect to the platform, wherein:

$$\theta = \tan^{-1}\left(\frac{d}{\left(\frac{w}{r+1}\right)}\right)$$

wherein d is a distance between the platform and the sill, w is a width of the elevator platform, and r is a number of reflections of the energy in the duct.

15. An elevator level control system as recited in claim 14 wherein said plurality of sensors is attached to the platform.

16. An elevator level control system as recited in claim 14 wherein said emitter is attached to one side of the platform and said plurality of sensors is attached to the opposite side of the platform with respect to said emitter.

17. An elevator level control system as recited in claim 14, further comprising an elevator position transducer device.

18. An elevator level control system for detecting relative positions between an elevator platform and a landing sill, said elevator level control system comprising:

a) a plurality of emitters for radiating energy into a reflection duct created by a gap between the platform and the landing sill such that the energy is transmitted through the reflection duct;

b) a plurality of sensors for providing level signals in response to the radiated energy of said plurality of emitters; and c) means for determining the relative position between the platform and the landing sill, said means responsive to the level signals wherein said plurality of emitters is attached to the platform at an angle $\theta$ with respect to the platform, wherein:

$$\theta = \tan^{-1}\left(\frac{d}{\left(\frac{w}{r+1}\right)}\right)$$

wherein
d is a distance between the platform and the sill,
w is a width of the elevator platform, and
r is a number of reflections of the energy in the duct.

19. An elevator level control system as recited in claim 18 wherein said plurality of emitters comprises a first emitter positioned such that it is substantially level with the landing sill if the platform is level with the sill and a second emitter positioned such that it is below the sill if the platform is level with the sill.

* * * * *